(12) United States Patent
Zettner

(10) Patent No.: US 11,176,555 B1
(45) Date of Patent: *Nov. 16, 2021

(54) LASER IDENTIFICATION DEVICES AND METHODS

(71) Applicant: United Services Automobile Association (USAA), San Antonio, TX (US)

(72) Inventor: Steven Dale Zettner, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 257 days.

This patent is subject to a terminal disclaimer.

(21) Appl. No.: 16/593,206

(22) Filed: Oct. 4, 2019

Related U.S. Application Data

(63) Continuation of application No. 14/644,858, filed on Mar. 11, 2015, now Pat. No. 10,496,991, which is a continuation of application No. 12/434,732, filed on May 4, 2009, now Pat. No. 8,990,118.

(51) Int. Cl.
G06Q 20/40 (2012.01)
G06Q 50/26 (2012.01)
G06Q 30/06 (2012.01)

(52) U.S. Cl.
CPC ... *G06Q 20/40145* (2013.01); *G06Q 30/0623* (2013.01); *G06Q 30/0641* (2013.01); *G06Q 50/265* (2013.01)

(58) Field of Classification Search
CPC ......... G06Q 20/40145; G06Q 30/0623; G06Q 30/0641; G06Q 50/265
USPC .............................................. 705/44
See application file for complete search history.

(56) References Cited

U.S. PATENT DOCUMENTS

| | | | |
|---|---|---|---|
| 5,617,304 A | 4/1997 | Huang | |
| 6,299,372 B1 | 10/2001 | Wang | |
| 6,623,136 B1 | 9/2003 | Kuo | |
| 6,900,779 B1* | 5/2005 | Geng ................... | H04N 13/395 345/30 |
| 6,924,748 B2* | 8/2005 | Obradovich ......... | G09B 29/106 340/905 |

(Continued)

FOREIGN PATENT DOCUMENTS

| | | | | |
|---|---|---|---|---|
| GB | 2449485 A | * 11/2008 | ............ | H04W 12/04 |
| WO | WO 2004/034610 | 4/2004 | | |
| WO | WO 2008/142367 | 11/2008 | | |

OTHER PUBLICATIONS

U.S. Appl. No. 14/644,858, filed Mar. 11, 2015, Zettner; Steven Dale.

(Continued)

*Primary Examiner* — James D Nigh
(74) *Attorney, Agent, or Firm* — Fish & Richardson P.C.

(57) ABSTRACT

Methods and systems for identification of objects using a laser. Data for an application including transactional data associated with a user is accessed from a computerized database in a system. Systems and methods operate to select objects from an electronic display. In an example, the systems and methods operate to select objects from an electronic display using a handheld laser identification device. In an example, an electronic display is in communication with a database that updates the display of objects displayed on the electronic display.

20 Claims, 10 Drawing Sheets

(56) References Cited

U.S. PATENT DOCUMENTS

| | | | |
|---|---|---|---|
| 6,934,689 B1* | 8/2005 | Ritter | G06Q 20/04 |
| | | | 705/16 |
| 6,955,445 B2 | 10/2005 | Omowale | |
| 7,139,450 B2 | 11/2006 | Khayim et al. | |
| 7,352,996 B2 | 4/2008 | Kumar | |
| 7,712,670 B2 | 5/2010 | Sauerwein et al. | |
| 7,967,190 B2 | 6/2011 | Hussey | |
| 8,001,488 B1* | 8/2011 | Lam | G06F 3/0238 |
| | | | 715/834 |
| 8,433,440 B2 | 4/2013 | Felique et al. | |
| 8,990,118 B1 | 3/2015 | Zettner | |
| 2002/0011519 A1 | 1/2002 | Shults, III | |
| 2005/0165784 A1 | 7/2005 | Gomez et al. | |
| 2007/0069030 A1 | 3/2007 | Sauerwein et al. | |
| 2008/0191864 A1* | 8/2008 | Wolfson | G06F 3/04815 |
| | | | 340/524 |
| 2008/0314969 A1 | 12/2008 | Hussey | |
| 2010/0198400 A1 | 8/2010 | Pascal et al. | |
| 2011/0119745 A1* | 5/2011 | Bremner | H04L 63/0853 |
| | | | 726/7 |

OTHER PUBLICATIONS

"OIF Releases Tunable Laser and Transmitter Assembly Agreements," REUTERS, pp. 1-3.

Gutierrez, David et al.: "TOM-PON Security Issues: Upstream Encryption is Needed," 3 pages.

USPTO Transaction History for U.S. Appl. No. 12/434,732, filed May 4, 2009, 255 pages.

USPTO Transaction History for U.S. Appl. No. 14/644,858, filed Mar. 11, 2015, 293 pages.

\* cited by examiner

LASER IDENTIFICATION DEVICES AND METHODS

CLAIM OF PRIORITY

This application is a continuation application of and claims priority under 35 U.S.C. § 120 to U.S. application Ser. No. 14/644,858, filed on Mar. 11, 2015, which in turn is a continuation application of and claims priority under 35 U.S.C. § 120 to U.S. application Ser. No. 12/434,732, filed on May 4, 2009, now U.S. Pat. No. 8,990,118, the entire contents of each of which are incorporated herein by reference.

FIELD

This application relates to a method and system for identification of a user by a light emitting device, identification of objects using a laser device, and more specifically to methods and systems used for consumer transactions.

BACKGROUND

Electronic billboards allow retailers to advertise products to consumers. Consumers desiring to purchase the advertised products use either a website or customer service personnel to complete transactions with retailers, which can be time and energy consuming as well as tedious. Moreover, people may not wish to share or broadcast identifying information.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a user operating a handheld laser identification device can be authenticated. In an example, the handheld laser identification device can be activated based on the user-identification data received from the user matching stored data.

In an example, the methods and systems herein can operate to generate a unidirectional, electromagnetic signal encoded with data associated with a user. In an example, the methods and systems herein can select an object by targeting the unidirectional, electromagnetic signal on a surface displaying the object. In an example, the methods and systems can receive information from a retailer at the handheld laser device and store data associated with the user and the retailer in the handheld laser device.

In an example, the methods and systems herein displays a video on a receiver, tracks products in the video; transmits a user-initiated, unidirectional, electromagnetic signal encoded with unique user-associated information to select a product shown on the video, sends the product to the user, and bills the user for the product.

Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for interface presentation are described. In the following description, for purposes of explanation, numerous specific details are set forth in order to provide a thorough understanding of example embodiments. It will be evident, however, to one skilled in the art that the present invention may be practiced without these specific details.

Figure 1:
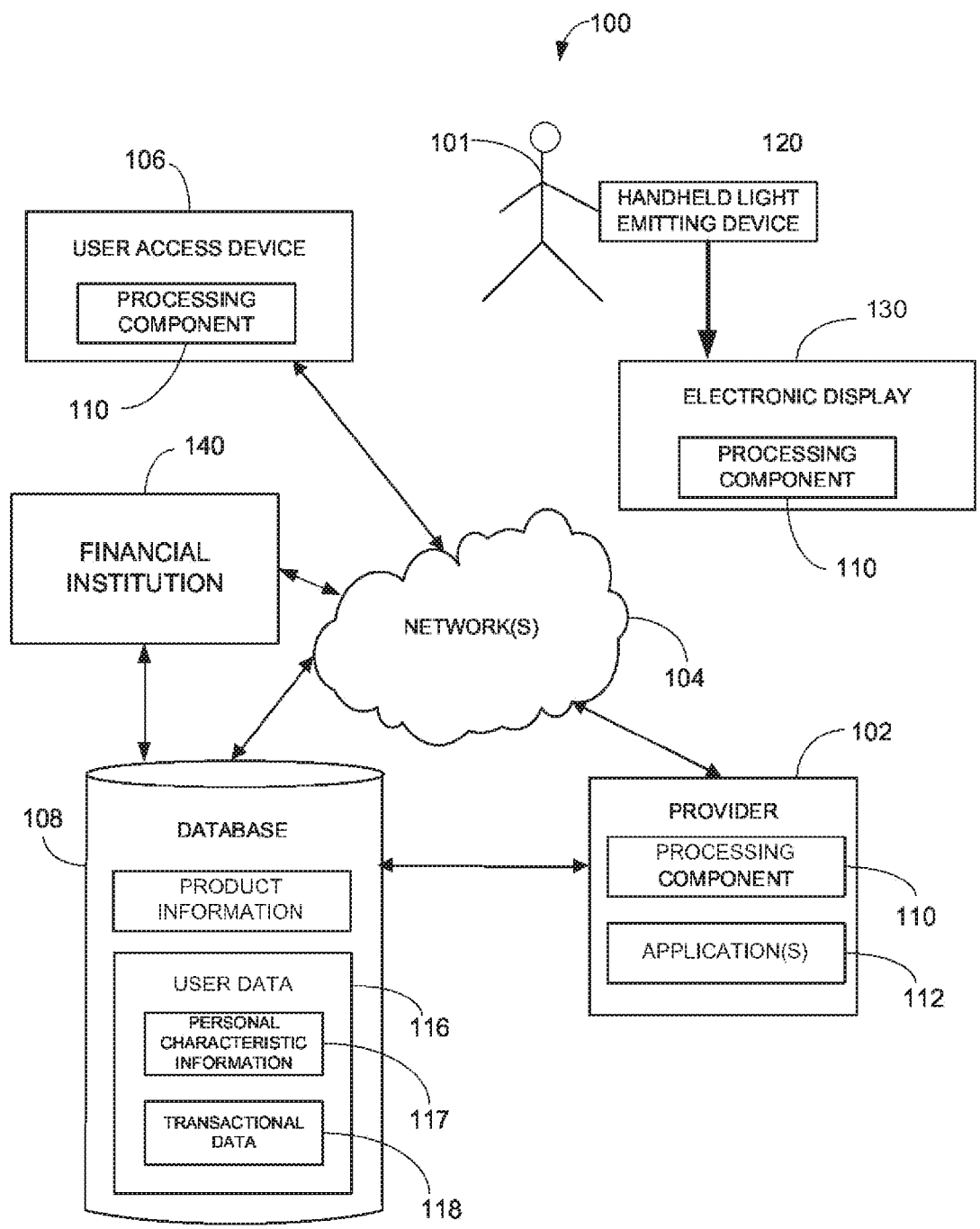
FIG. 1 is a block diagram of an example content system according to an example embodiment.

FIG. 1 illustrates an example content system 100 in which a user 101 communicates with a provider 102 and/or a financial institution 140 over a network 104 using a handheld laser device 120 and an electronic display 130. The provider 102 and/or financial institution 140 can be in a client-server relationship, peer-to-peer relationship, or another type of relationship with an access device 106.

The provider 102 provides content and access to functionality available through the provider 102. For example, the provider can provide application data 114 and/or access to functionality provided by one or more applications 112 running on the provider 102 or otherwise available through the provider 102.

The financial institution 140 communicates with the provider 102 and the database 108 and provides various functionalities that can include among other things, credit verification of user 101, and payment for products/services received by user 101 from provider 102, etc.

The network 104 over which the provider 102 and the access device 106 are in communication can be a Global System for Mobile Communications (GSM) network, an Internet Protocol (IP) network, a Wireless Application Protocol (WAP) network, a WiFi network, local area network (LAN), or a IEEE 802.11 standards network as well as various combinations thereof. Other conventional and/or later developed wired and wireless networks may also be used.

The access device 106 can send requests and other information over the network 104 to the provider 102. Examples of the access device 106 include a set-top box (STB), a receiver card, a mobile telephone, a personal digital assistant (PDA), a MP3 player, laptop computer, netbook, and a computing system; however other devices may also be used.

The handheld device 120 can be operated by the user 101 to send a unidirectional electromagnetic signal 121. In an example, the unidirectional electromagnetic signal 121 includes a light beam. In an example, the light beam is a laser beam. In an example, the laser beam could be either in the visible or invisible region of the electromagnetic spectrum. In an example the unidirectional electromagnetic signal 121 is targeted by the user 101 to impinge on the surface of the electronic display 130 in order to select or tag a portion of the image displayed on the electronic display. In an example, the unidirectional electromagnetic signal 121 can be encoded with user-associated data. In an example, the user-associated data encoded in the unidirectional electromagnetic signal 121 includes identification information such as name, address, billing information, customer identification, credit card information, etc., of the user 120 that can be provided to provider 102. In an example, the user-associated data includes, but is not limited, to personal characteristic information 117 and/or transactional data 118. The personal characteristic information 117 may include, by way of example, age data, gender data, address data, contact data, and/or a collection of biometrics associated with the user 101. Other types of information may also be used for personal characteristic.

One or more processing components 110 optionally provides one or more interfaces to an application for electronic shopping or related fields of such an application and/or other information to a user through the access device 106. The provider 102, handheld laser device 120, electronic display 130 and/or the access device 106 include the one or more processing components 110. An example embodiment of the processing components 110 are described in greater detail herein.

The transactional data 118 relates to transactions of the user involving shopping for a product available from the provider 102 or others and displayed on the electronic display 130. In an example, the transaction data is the financial transaction data of the user. For example, the transactional data 118 can include information regarding a purchase of a particular product made by a user on a particular day from a particular electronic display 130.

The network 104 can include a communication system that can include at least one of a telephone subsystem 331 includes devices that can communicate thorough telephone systems, e.g., those using "plain old telephone service" (POTS), Public Switched Telephone Network (PSTN), voice over IP (VOIP), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, and others. The network can include communication systems that operate on IEEE 802.11 series, Bluetooth, IEEE 802.16 series, among others. Further examples of communication standards are Global System for Mobile Communications (GSM) network, an Internet Protocol (IP) network, a Wireless Application Protocol (WAP) network, a WiFi network, or local area network (LAN), as well as various combinations thereof.

Figure 2:
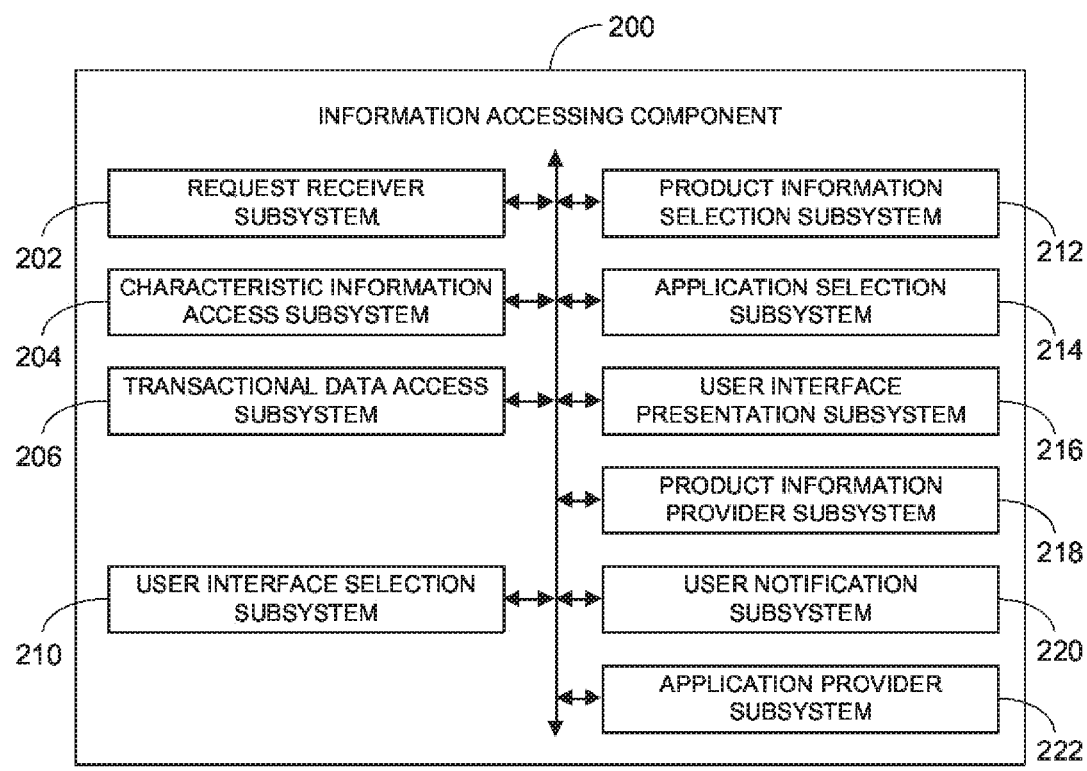
FIG. 2 is a block diagram of an example information accessing component that may be deployed in the content system of FIG. 1 according to an example embodiment.

FIG. 2 illustrates an information accessing component 200 that can include a request receiver subsystem 202, a characteristic information access subsystem 204, a transactional data access subsystem 206, a user interface selection subsystem 210, a product information selection subsystem 212, an application selection subsystem 214, a user interface presentation subsystem 216, a product information provider subsystem 218, a user notification subsystem 230, and/or the application provider subsystem 222. Other subsystems may also be used. These subsystems can include electronic processing devices and memories. Electronic processing devices can include general purpose processors that are loaded with specific instructions. In an example, the electronic processing devices can include hardware, e.g., electronics that is specifically designed to perform their specific tasks.

The request receiver subsystem 202 receives a product or service request and/or a login request from the user. The request can be received through a user interface presented on the access device 106 or otherwise received.

The characteristic information access subsystem 204 accesses the personal characteristic information 117 of a user. The personal characteristic information 117 can be accessed from the database 108 or otherwise accessed. The personal characteristic information 117 may be accessed in response to the receipt of a login request by the request receiver subsystem 202.

The transactional data access subsystem 206 accesses the transactional data 118 associated with the user. The transactional data 118 can be accessed from the database 108 or otherwise accessed.

The user interface selection subsystem 210 selects a user interface for the user among available user interfaces in accordance with the personal characteristic information 117 received from the characteristic information access subsystem 204, and/or the transactional data 118 received from the transactional data access subsystem 206. The available user interfaces can include different interface formats, different interface layouts, different interface color schemes, and/or different functionality available through the available user interfaces. The user interface subsystem 210 can further select a user interface that is appropriate for the electronic transaction selected by the user.

The product information selection subsystem 212 selects the product information 114 for the user in accordance with the personal characteristic information 117 received from the characteristic information access subsystem 204.

The application selection subsystem 214 selects the application 112 for the user in accordance with the personal characteristic information 117 received from the characteristic information access subsystem 204. The user interface presentation subsystem 216 presents the user interface to the user (e.g., on the access device 106) as selected by the user interface selection subsystem 210. The product information provider subsystem 218 provides the product information 114 to the user through the user interface as selected by the product information selection subsystem 212.

The user notification subsystem 220 notifies the user of availability of the application 112 in accordance with the application selection by the application selection subsystem 214. The application provider subsystem 222 provides the application request received by the request receiver subsystem 202 to the application 112.

Each of the subsystems are information handling systems (IHS) that are configured to execute processes and perform operations (e.g., processing or communicating information) in response to input. Each such IHS is formed by various electronic circuitry components. An IHS is an electronic device capable of processing, executing, or otherwise handling information in a physical form. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 104).

Figure 3:
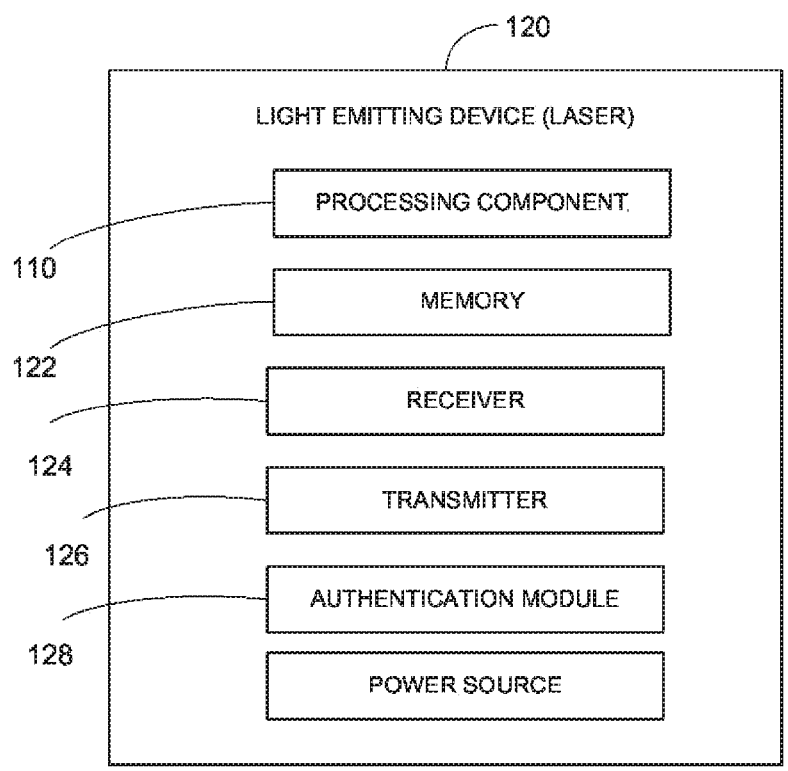
FIG. 3 is a block diagram of the handheld laser device of FIG. 1 according to an example embodiment.

FIG. 3 is a block diagram of the handheld laser device 120 of FIG. 1 according to an example embodiment. Handheld laser device 120 includes a processing component 110, a memory 122, a receiver 124, a transmitter 126, and an authentication module 128.

In an example, transmitter 126 is configured to generate a user-initiated unidirectional electromagnetic signal 121. In an example, the user-initiated unidirectional electromagnetic signal 121 includes a laser. In an example, the laser is a partially coherent laser beam. In an example, the transmitter 126 is configured to output a laser signal similar to that generated by a visible laser pointer operating in the wavelength range of about 400 nm to about 700 nm. In an example, the transmitter 126 generates a laser with an output power of less than 1 mW similar to a Class II laser (as classified by ANSI). In an example, the transmitter 126 is configured to output a laser signal operating between 1 mW and 5 nW for a Class IIIa laser (as classified by ANSI). In an example, transmitter 126 outputs at least one of a red, blue, and green laser. In an example, the transmitter 126 is configured to generate a series of laser pulses that corresponds to an encoded signal that carries user-associated information of user 101. A light based signal can carry a greater amount of data in a same time period relative to most radio frequency communications. The uni-directional signal provides for wireless, directional optical communication.

In an example, the receiver 124 is configured to communicate with at least one of the electronic display 130, the financial institution 140, and the provider 102. In an example, the processing component 110 encodes the user-associated information prior to being transmitted by the transmitter 126.

In an example, the processing component 110 encrypts the user-associated information prior to being transmitter by the transmitter 126. In an example, the user-associated information is stored in the memory 122.

In an example, the authentication module 128 is configured to receive user-identification data from the user 101. In an example, the authentication module 128 compares the received user-identification data with stored values in the memory 122 and determines if there is a match. In an example, if a match is determined after comparing the received user-identification data with stored values, then the user 101 may be authenticated and the handheld device 120 is made operational. In an example, in the event where a match is not determined, the handheld device 120 can be made inoperable to prevent identity theft. In an example the authentication module 128 is configured to receive various types of user-identification data such as biometric information (e.g., fingerprint), personal identification number, unique sets of orchestrated motion of the handheld device, etc. In an example, a manual combination number lock is provided that can be used for authenticating the user 101. In an example, an electronic locking mechanism can be provided that can be used for authenticating the user 101.

Figure 4:
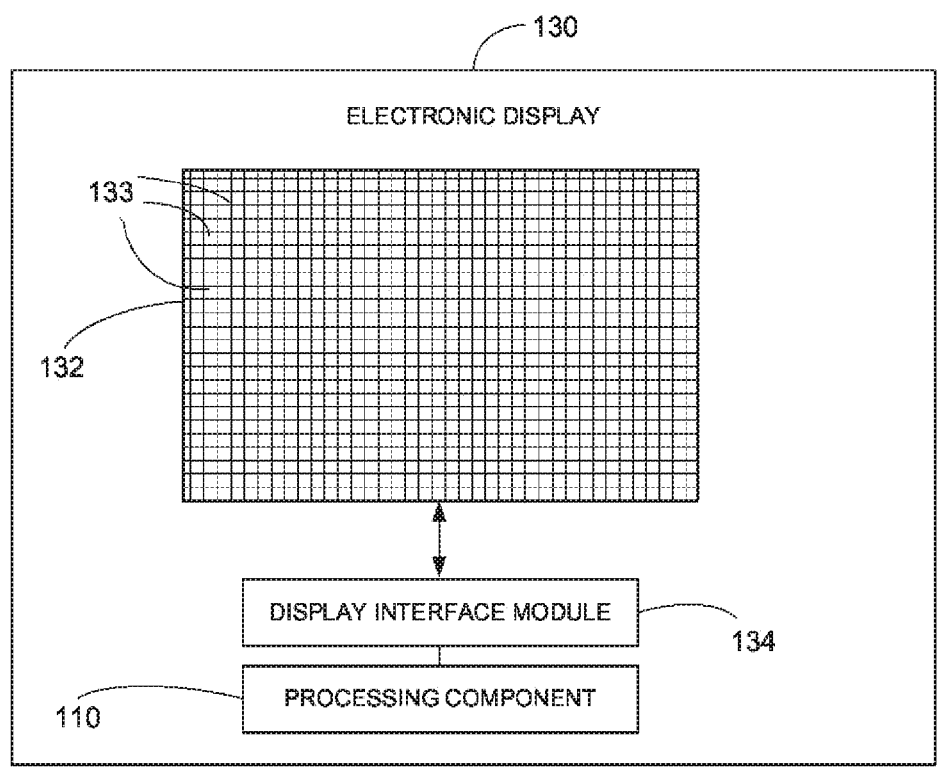
FIG. 4 is a block diagram of the electronic advertising display of FIG. 1 according to an example embodiment.

FIG. 4 is a block diagram of the electronic advertising display 130 of FIG. 1 according to an example embodiment. In an example, advertising display 130 includes an electronic display screen 132, a display interface module 134 and a processing component 110. In an example, the display interface module 134 is coupled to the processing component 110 and the electronic display screen 132. In an example, the electronic display screen 132 includes a plurality of sensors 133 arranged in an array. In an example, the plurality of sensors 133 is configured to receive a laser signal and provide a signal to the display interface module 134 identifying the portion of the electronic display screen 132 targeted by a laser signal 121 received from handheld device 120. In an example, the plurality of sensors 133 is configured to receive a visible laser operating in the wavelength range of about 400 nm to about 700 nm. In an example, the plurality of sensors 133 is configured to receive a laser with an output power of less than 1 mW similar to a Class II laser (as classified by ANSI). In an example, the plurality of sensors 133 is configured to receive a laser signal operating between 1 mW and 5 nW for a Class IIIa laser (as classified by ANSI). In an example, plurality of sensors 133 is configured to receive a red laser, blue laser, and a green laser. In an example, the plurality of sensors 133 is configured to receive a series of laser pulses that corresponds to an encoded signal that carries user-associated information of user 101.

Figure 5:
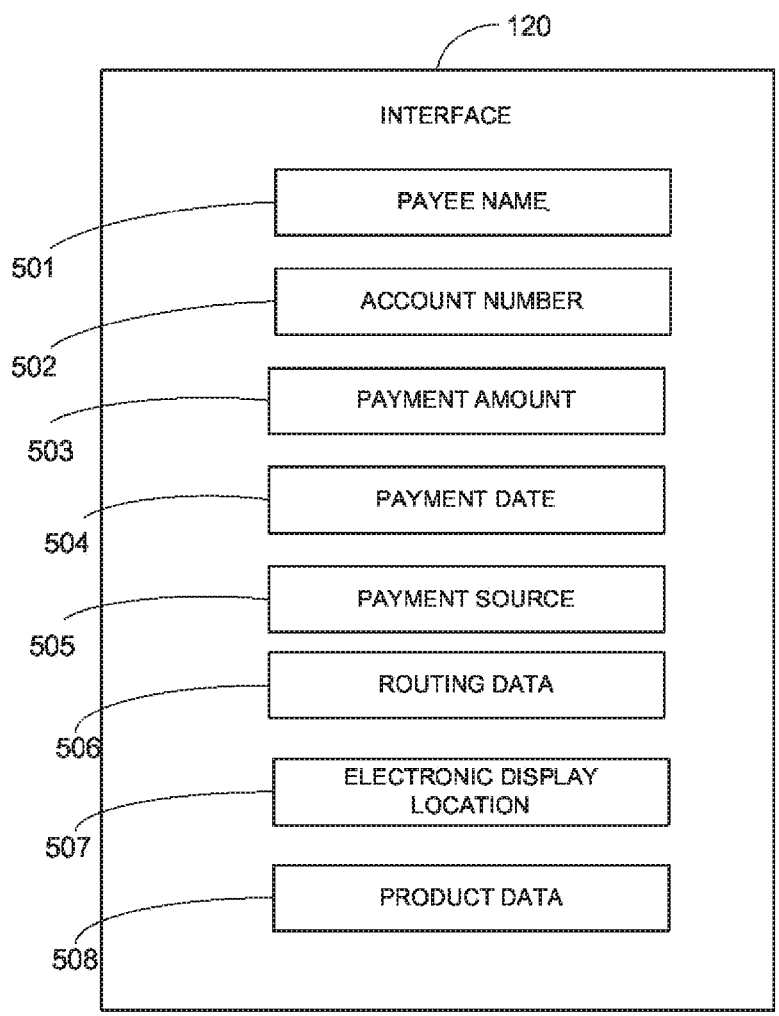
FIG. 5 is a graphical user interface representing an electronic financial transaction(s) according to an example embodiment.

FIG. 5 shows a graphical user interface 500 corresponding to an electronic transaction. Interface 500 includes fields 501-508 that identify specific transaction(s). Field 501 includes the payee name. Field 502 includes an account number. Field 503 includes a payment amount. Field 504 includes a payment date. Field 505 includes a payment source. Field 506 includes routing information. Field 507 includes information regarding the location of an electronic display that is related to the purchase transaction. Field 508 includes product data of the product(s) associated with the electronic transaction. Other fields can be added as required for a specific transaction. Interface 500 can be displayed to the user (payor), for example, on access device 106, each time an electronic payment is setup or each time an electronic payment is to be made. In an example, the electronic payment data entered into interface 500 is stored in database 108. After the electronic payment is made, the data relating to the electronic payment is stored in the database 108 as part of transactional data 118.

Electronic transactions described herein are part of electronic billboard shopping, which may be offered by providers 102 that includes electronic bill payment, which can use interface 500 and related data to set up an electronic transaction. In an example, when a user 101 targets the laser output of the handheld device 120 onto an object displayed on the electronic display 130, the object is selected for purchase and the provider automatically sends the object to the user 101 and bills the user 101 for the purchase of the product. Automatically can be the absence of human intervention, i.e., the system or subsystems inserts the appropriate data into the related fields of the application. The systems or components of systems apply rules to filter the user's transaction data to assign appropriate user transactional data to fields in the application.

In an example, the user 101 can send money from his account to a provider 102, using a financial institution 140 that accepts electronic transfer of funds. The electronic payment is credited against the user's account with the financial institution 140. The provider 102 can also electronically bill using electronic invoicing sent by e-mail or viewed on a secure web site. Other features of electronic bill payment allows the user 101 to schedule payments in advance to be made on a specified date, the ability to manage payments from any computer with a web browser, and various options for searching one's recent payment history, and integration of the electronic payment data with accounting or personal finance software as well as storage in the database 108 as transaction data 118. As discussed herein, the electronic bill payment data stored in the database 108 as transaction data 118 can be scanned, filtered, have business rules applied thereto, and populated into a document or application.

In an example, the systems or components of systems access the database to retrieve the personal identification data and assigns user identification data to fields in the application. In an example, the systems or components of systems access the database to retrieve the user transactional data relating to credits to the user's account and insert this data into fields in the application. In an example, the systems or components of systems access the database to retrieve the user transactional data relating to debits to the user's account and insert this data into fields in the application. In an example, the systems or components of systems access the database to retrieve the user's transactional data relating to user's size preference data and insert this data into fields in the application. In an example, accessing transactional data can include accessing data stored at the potential lending institution associated with at least one of online bill payment data and bank account transactions.

Figure 6:
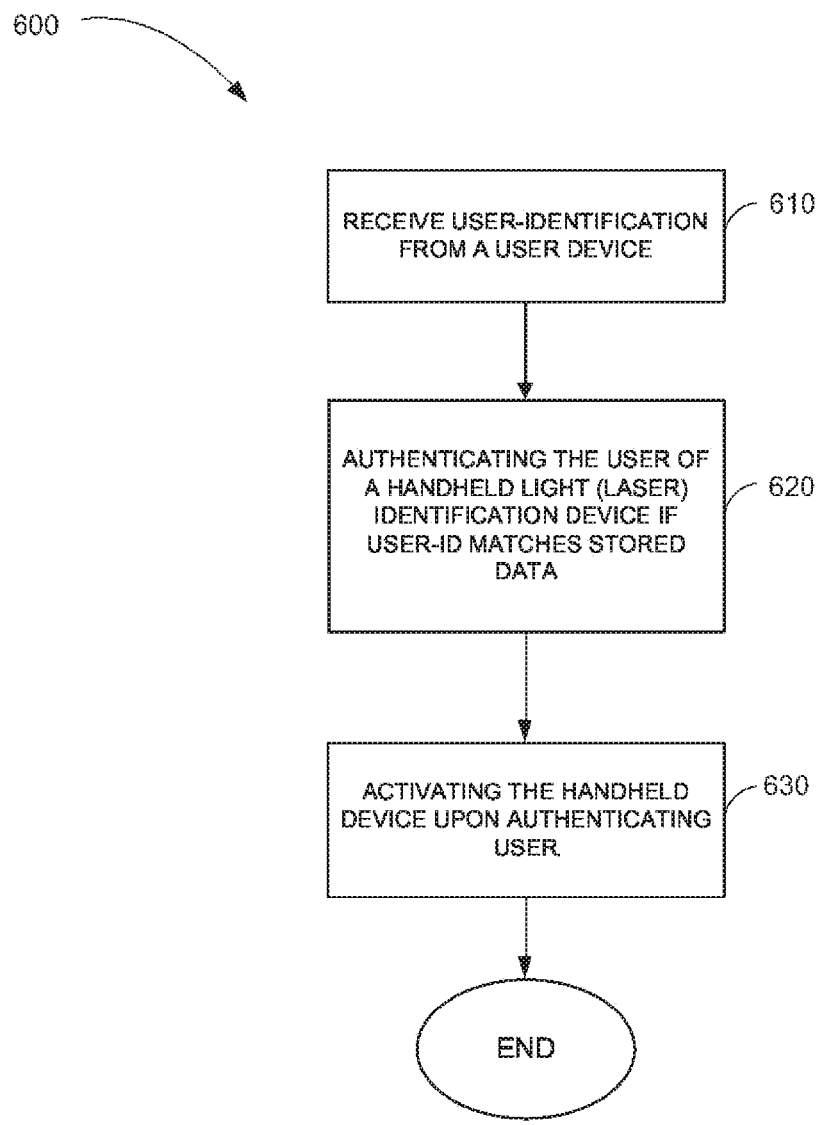
FIG. 6 is a flowchart illustrating a method of authenticating a user operating a handheld laser identification device in accordance with an example embodiment.

FIG. 6 is a flowchart illustrating a method 600 of authenticating a user operating a handheld laser identification device in accordance with an example embodiment. Various subsystems as described herein can perform the method in an example.

At 610, the method 600 includes receiving user-identification data from the user 101. In an example, receiving user-identification data includes receiving user's biometric information. In an example, receiving user-identification data include receiving a user's secret personal identification number (PIN).

At 620, the method 600 includes authenticating the user 101 of a handheld laser device 120 if the user-identification data provided by the user 101 matches data stored in memory 122. In an example, the method 600 authenticates the user 101 by verifying personal identification information including at least one of name, address, telephone number, and email address. In an example, authenticating the user 101 includes providing a locking mechanism configured to render the handheld laser identification device inoperable when user authentication fails.

At 630, the method 600 can include activating the handheld laser device 120 upon authenticating the user 101. In an example, a user activates the handheld laser device 120 and logs into the provider 102 through the network 104. In an example, upon authentication, the method accesses transactional data associated with the user 101 from a database 108. In an example, the provider 102 accesses the database 108 to access the user's transactional data 118.

Figure 7:
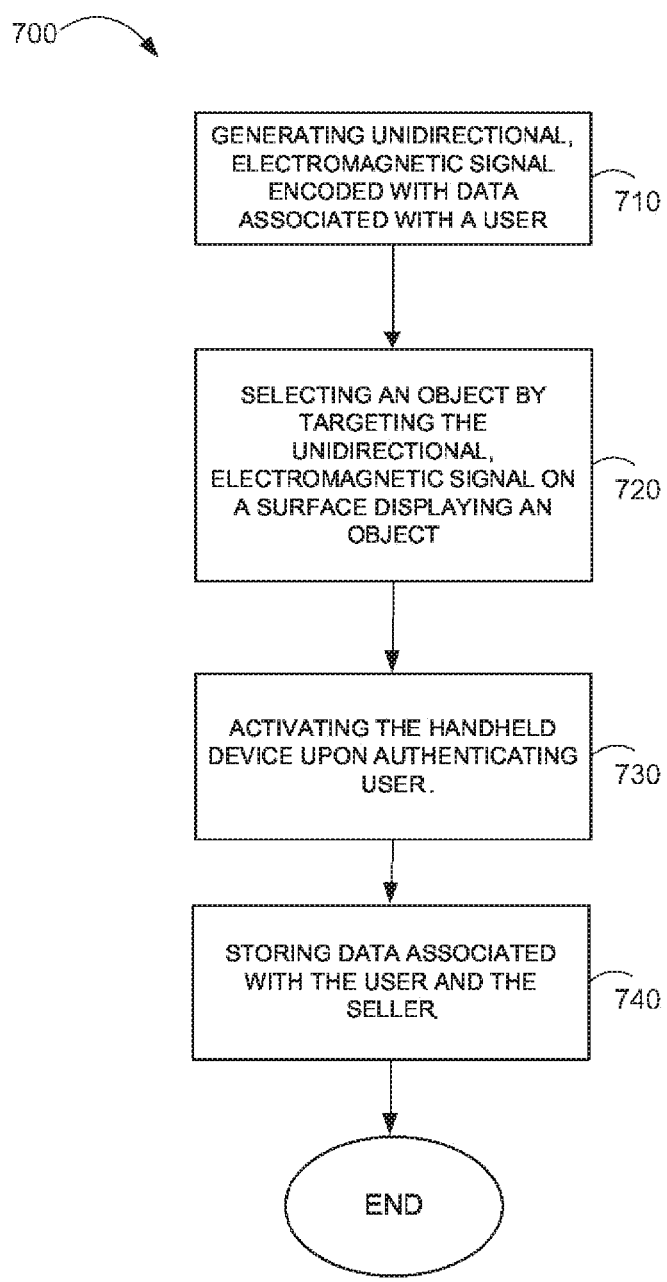
FIG. 7 is a flowchart illustrating a method of performing a business transaction using a handheld laser identification device in accordance with an example embodiment.

FIG. 7 is a flowchart illustrating a method 700 of performing a business transaction using a handheld laser identification device in accordance with an example embodiment. The method 700 can be performed using the handheld laser device 120, the electronic display 130, the provider 102 and/or the access device 106 of the content system 100 (see FIG. 1) or otherwise performed.

At 702, the method 700 includes generating a unidirectional electromagnetic signal encoded with data associated with a user.

At 704, the method 700 includes selecting an object by targeting the unidirectional, electromagnetic signal on a surface displaying an object.

At 706, the method 700 includes receiving information from a retailer at a handheld laser device 120.

At 708, the method 700 includes storing data associated with the user and the retailer in the handheld laser device.

In an example, the method 700 triggers a financial notification that can include providing a recurring payment to a financial institution 140, a provider 102 and/or third party and offering a product to match the recurring payment. In an example, the method 700 can include providing an automated payment to a financial institution 140.

Figure 8:
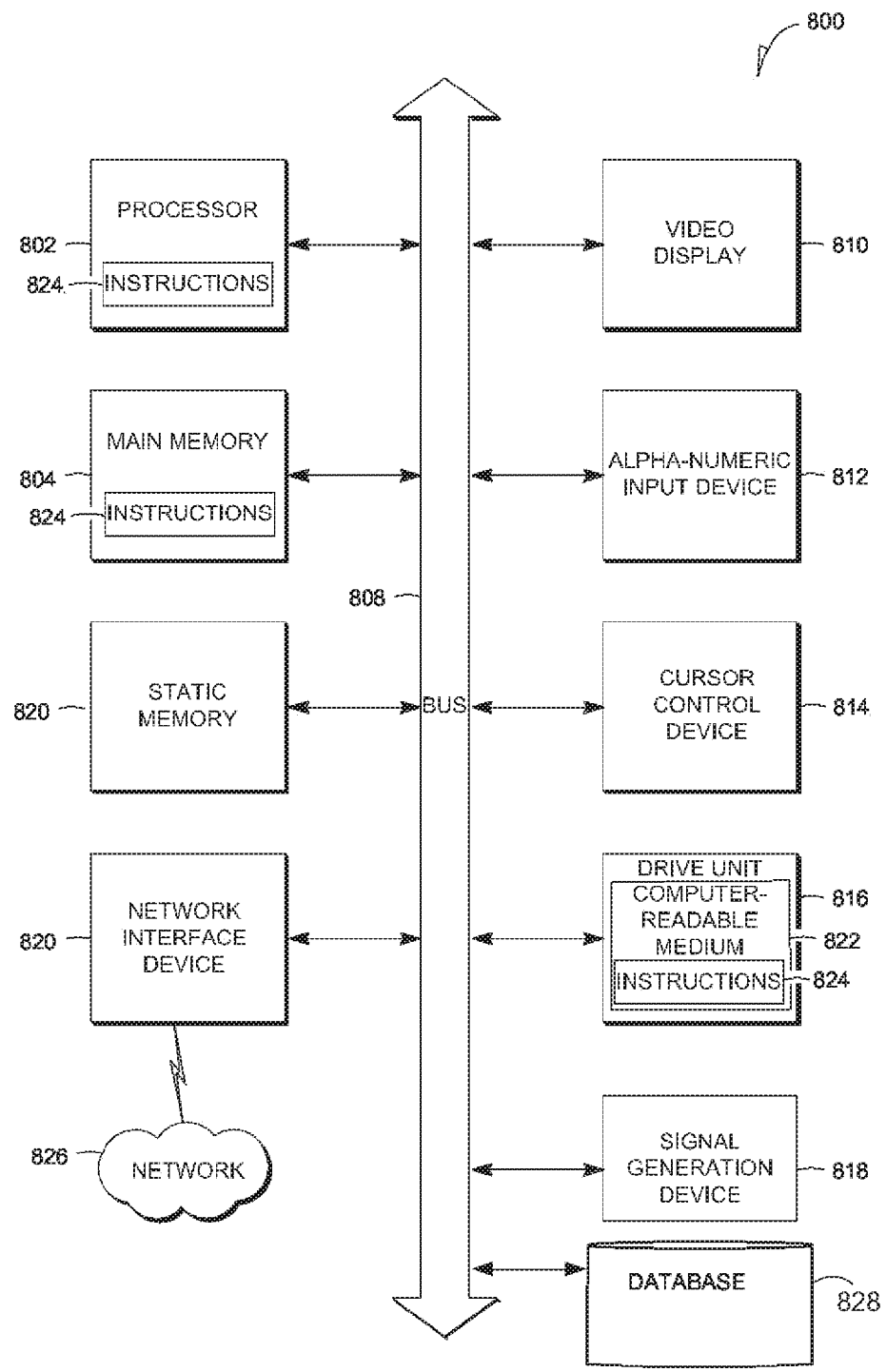
FIG. 8 illustrates a diagrammatic representation of a machine in the example form of a computer system within which a set of instructions for causing the machine to perform any one or more of the methodologies discussed herein may be stored or executed.

FIG. 8 shows a diagrammatic representation of machine in the example form of a computer system 800 within which a set of instructions may be executed causing the machine to perform any one or more of the methods, processes, operations, or methodologies discussed herein. The retailer 102 may be deployed on the computer system 800. The access device 106 may include the functionality of the computer system 800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal displays (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Figure 9:
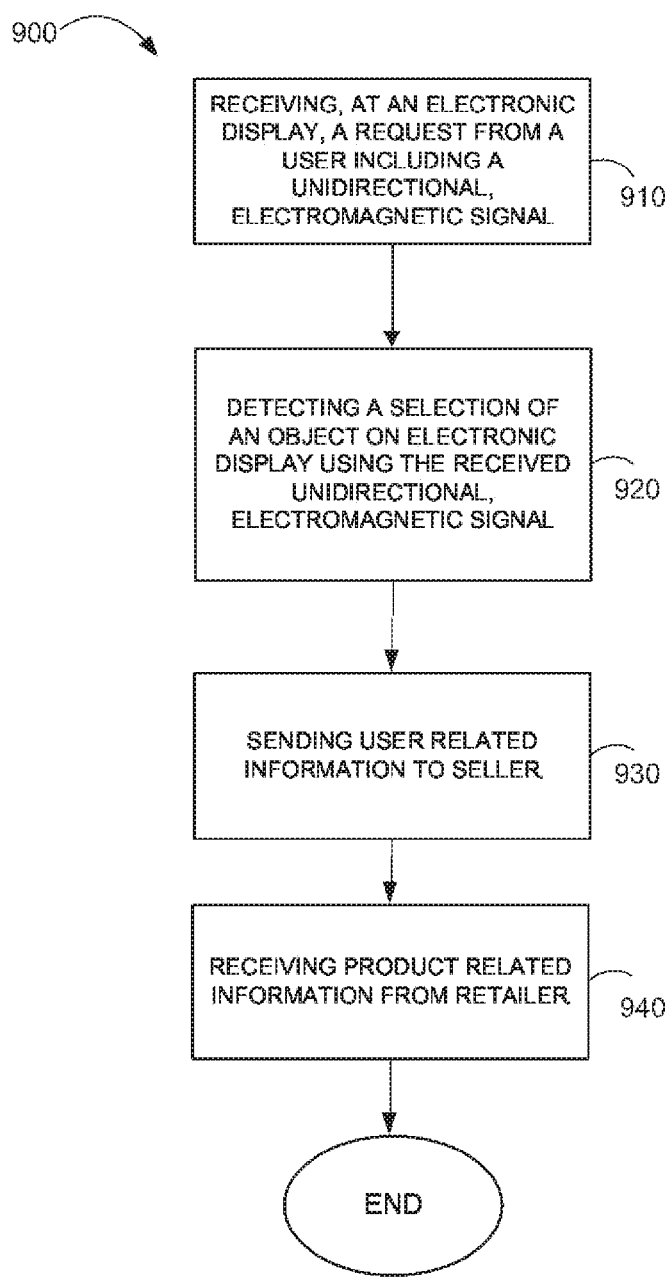
FIG. 9 is a flowchart illustrating a method of selecting a product from an electronic display in accordance with an example embodiment.

FIG. 9 is a flowchart illustrating a method 900 of selecting a product from an electronic display in accordance with an example embodiment. The method 900 can be performed using the handheld laser device 120, the electronic display 130, the provider 102 and/or the access device 106 of the content system 100 (see FIG. 1) or otherwise performed.

At 910, method 900 includes receiving at an electronic display 130 a request from a user 101 including a unidirectional, electromagnetic signal.

At 920, method 900 includes a detecting a selection of an object displayed on the electronic display 130 using the received unidirectional, electromagnetic signal.

At 930, method 900 includes sending user related information to the provider 102. In an example, the provider 102 includes a retailer advertising various products and services on the electronic display 130.

At 940, method 900 includes receiving product related information from the provider 102.

Figure 10:
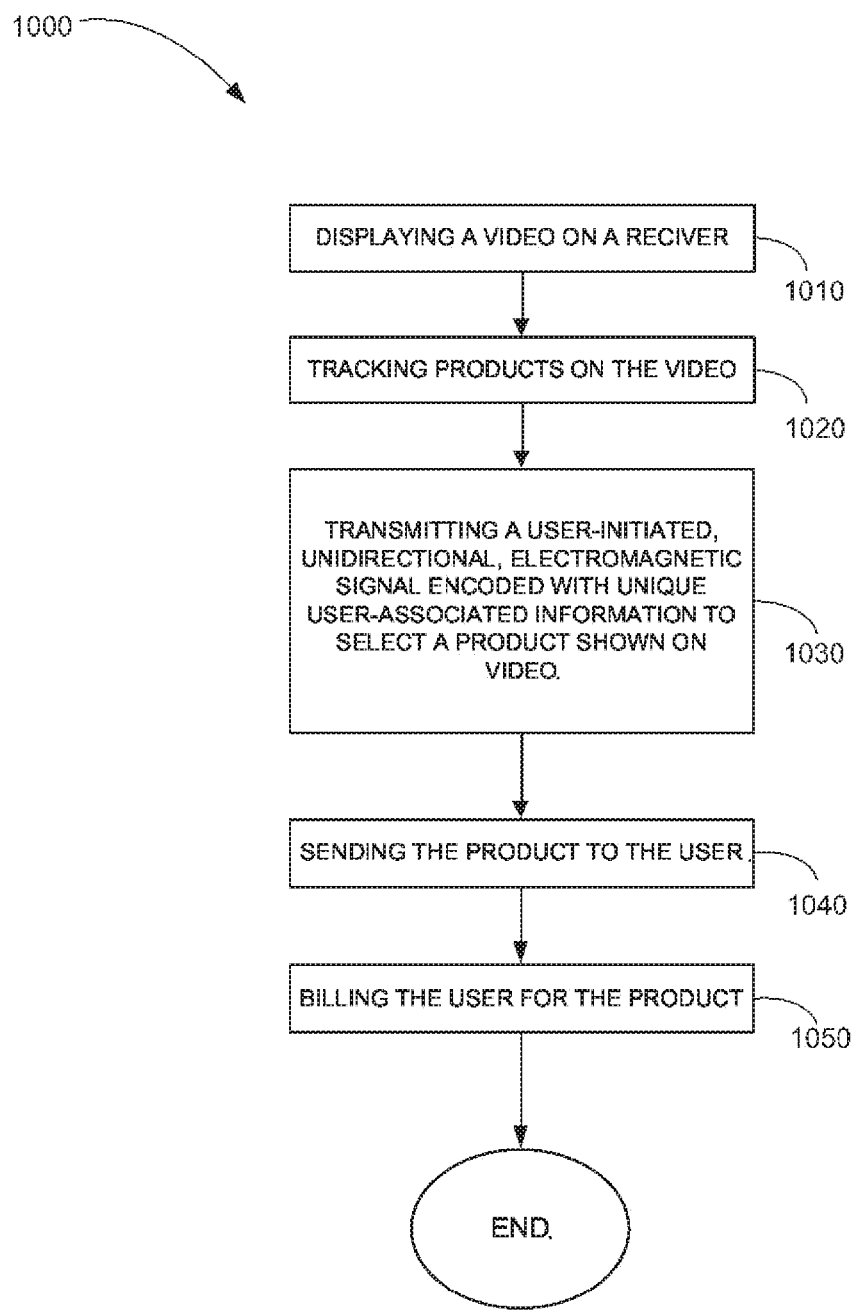
FIG. 10 is a flowchart illustrating a computerized method of shopping for a product displayed on a video in accordance with an example embodiment.

FIG. 10 is a flowchart illustrating a computerized method 1000 of shopping for a product displayed on a video in accordance with an example embodiment. The method 900 can be performed using the handheld laser device 120, the electronic display 130, the provider 102 and/or the access device 106 of the content system 100 (see FIG. 1) or otherwise performed.

At 1010, the method 1000 includes displaying a video on an electronic display including a receiver.

At block 1020, the method 1000 includes tracking products in the video. In an example, tracking products includes tagging products in the video using laser signal 121 generated by the handheld laser device 120. In an example tracking products includes tracing around the product of interest to the user with the laser signal 121 transmitted by the handheld laser device 120. In an example, tracking products includes making a circling motion around a desired product in the displayed video using the laser signal transmitter 121 by the handheld laser device 120.

At block 1030, the method 1000 includes transmitting a user-initiated, unidirectional, electromagnetic signal encoded with unique user-associated information to select a product shown on the video.

At block 1040, the method 1000 includes sending the product to the user.

At block 1050, the method 1000 includes billing the user for the product.

In an example, the method 1000 can include verifying transactional data with the user 101. The method 1000 can include providing the data from the transactional database 118 to the user 101 for verification. The electronic transaction can be presented to the user 101 over the network 104 and displayed on the access device 106. In a further example, the purchase order can be emailed to the user 101 for editing. The user can edit in errors in a purchase order using user access device 106. In an example, the method 1000 can include referring an alternate products or services to the user 101 if the user 101 decides not to purchase a particular product or service displayed in the electronic display 130.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Accordingly, the present disclosure describes examples that result in an improved user experience. In addition, the present disclosure describes examples that result in reducing the interaction time with customer service personnel thereby reducing costs for product and service providers. In some examples the methods and systems described herein can further reduce the likelihood of errors and fraud. Additionally, the present disclosure describes examples that can result in a provider getting a much more accurate appreciation of customer's relative desire to purchase products and services through data collected from electronic displays that receive unidirectional electromagnetic signal from handheld laser devices. The use of a unit-directional optical signal can further provide high data rates and improved security over radio-frequency communications.

Aspects of the embodiments may be implemented in the general context of computer-executable instructions, such as program modules, being executed by a computer. Generally, program modules include routines, programs, objects, components, data structures, etc. that performs particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for displaying a video on a receiver, tracking products in the video, transmitting a user-initiated, unidirectional, electromagnetic signal encoded with unique user-associated information to select a product shown on the video, sending the product to the user, and billing the user for the product have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:

1. A system comprising:
a plurality of sensors arranged in an array, each of the plurality of sensors configured to receive an electromagnetic signal encoded with user-associated data; and
one or more processors communicatively coupled to the plurality of sensors and configured to identify, responsive to at least one sensor of the plurality of sensors receiving the electromagnetic signal, a product based at least partially on a position of the at least one sensor in the array.

2. The system of claim 1, wherein the user-associated data comprises encrypted user-associated data.

3. The system of claim 1, further comprising a transmitter configured to generate and transmit the electromagnetic signal upon authentication of a user of the transmitter.

4. The system of claim 1, wherein the electromagnetic signal comprises a pulsed laser signal.

5. The system of claim 1, wherein the one or more processors are further configured to generate transaction information based on the electromagnetic signal, the system further comprising:
an access device comprising:
a receiver configured to receive the transaction information; and
a user interface configured to display the transaction information.

6. The system of claim 1, further comprising an electronic display communicatively coupled to the plurality of sensors and configured to display product information.

7. The system of claim 1, wherein the one or more processors are further configured to:
extract the user-associated data from the electromagnetic signal;
transmit the user-associated data to a retailer system; and
transmit user-selected product information representing the identified product to the retailer system.

8. A method, comprising:
receiving, by at least one sensor of a plurality of sensors arranged in an array, an electromagnetic signal encoded with user-associated data; and
identifying, by one or more processors communicatively coupled to the plurality of sensors and responsive to the at least one sensor of the plurality of sensors receiving the electromagnetic signal, a product based at least partially on a position of the at least one sensor in the array.

9. The method of claim 8, wherein the user-associated data comprises encrypted user-associated data.

10. The method of claim 8, further comprising generating and transmitting the electromagnetic signal upon authentication of a user.

11. The method of claim 8, wherein the electromagnetic signal comprises a pulsed laser signal.

12. The method of claim 8, further comprising generating, by the one or more processors, transaction information based on the electromagnetic signal.

13. The method of claim 12, further comprising:
receiving, by an access device, the transaction information; and
displaying, by a user interface on the access device, the transaction information.

14. The method of claim 8, further comprising displaying, by an electronic display communicatively coupled to the plurality of sensors, product information.

15. The method of claim 8, further comprising:
extracting, by the one or more processors, the user-associated data from the electromagnetic signal;
transmitting, by the one or more processors, the user-associated data to a retailer system; and
transmitting, by the one or more processors, user-selected product information representing the identified product to the retailer system.

16. A non-transitory computer storage medium encoded with computer program instructions that when executed by one or more processors cause the one or more processors to perform operations comprising:
identifying, by one or more processors communicatively coupled to a plurality of sensors arranged in an array and responsive to at least one sensor of the plurality of sensors receiving an electromagnetic signal encoded with user-associated data, a product based at least partially on a position of the at least one sensor in the array.

17. The non-transitory computer storage medium of claim 16, wherein the user-associated data comprises encrypted user-associated data.

18. The non-transitory computer storage medium of claim 16, wherein the electromagnetic signal comprises a pulsed laser signal.

19. The non-transitory computer storage medium of claim 16, the operations further comprising generating transaction information based on the electromagnetic signal.

20. The non-transitory computer storage medium of claim 16, the operations further comprising:
extracting the user-associated data from the electromagnetic signal;
transmitting the user-associated data to a retailer system; and
transmitting user-selected product information representing the identified product to the retailer system.

* * * * *

UNITED STATES PATENT AND TRADEMARK OFFICE
CERTIFICATE OF CORRECTION

| | | |
|---|---|---|
| PATENT NO. | : 11,176,555 B1 | Page 1 of 1 |
| APPLICATION NO. | : 16/593206 | |
| DATED | : November 16, 2021 | |
| INVENTOR(S) | : Zettner | |

It is certified that error appears in the above-identified patent and that said Letters Patent is hereby corrected as shown below:

On the Title Page

Item [57], Column 2, Line 5, delete "the" and insert -- these --, therefore.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*